United States Patent [19]

Takagi et al.

[11] Patent Number: 5,791,716
[45] Date of Patent: Aug. 11, 1998

[54] STRUCTURE FOR SUPPORTING PILLAR GARNISH FOR AUTOMOBILE

[75] Inventors: Masahiro Takagi, Fujisawa; Katsumi Obata, Zama, both of Japan

[73] Assignee: Nissan Motor Co., Ltd., Yokohama, Japan

[21] Appl. No.: 652,000

[22] Filed: May 23, 1996

[30] Foreign Application Priority Data

May 23, 1995 [JP] Japan .................... 7-123740

[51] Int. Cl.[6] .................... B60R 13/02
[52] U.S. Cl. .................... 296/39.1; 280/751; 52/511; 52/716.5
[58] Field of Search .................... 296/39.1, 189; 280/751 (U.S. only); 24/293–295; 52/511, 716.5

[56] References Cited

U.S. PATENT DOCUMENTS

| | | | |
|---|---|---|---|
| 3,312,030 | 4/1967 | Gillespie | 52/511 |
| 4,749,203 | 6/1988 | Bright | 52/716.5 |
| 5,575,500 | 11/1996 | Mimura et al. | 280/751 |

*Primary Examiner*—Dennis H. Pedder
*Attorney, Agent, or Firm*—Foley & Lardner

[57] ABSTRACT

The pillar garnish is supported by a steel bracket interposed between the pillar garnish and the pillar. The bracket includes a body frame having a substantially channel-like cross section formed by a top surface opposite to the pillar garnish, and two side surfaces extending from two edge lines of the top surface substantially perpendicular to the top surface toward the pillar, the body frame having free ends of the two side surfaces which are welded to the pillar, a claw portion projecting over the body frame and capable of being connected to the pillar garnish, and a plurality of tag portions formed between the side surfaces of the body frame, the tag portion extends from a cut portion formed in the top surface of the body frame in the same direction as the direction of the free end of either side surface of the body frame, and a free end of the tag portion is positioned at a position defined by a distance shorter than the distance from a free end of another side surface of the body frame to the top surface of the body frame, the free end of the tag portion being formed to substantially run parallel to the top surface toward outside.

12 Claims, 6 Drawing Sheets

STRUCTURE FOR SUPPORTING PILLAR GARNISH FOR AUTOMOBILE

BACKGROUND OF THE INVENTION

The present invention relates to a structure for supporting a pillar garnish for an automobile.

Figure 1:
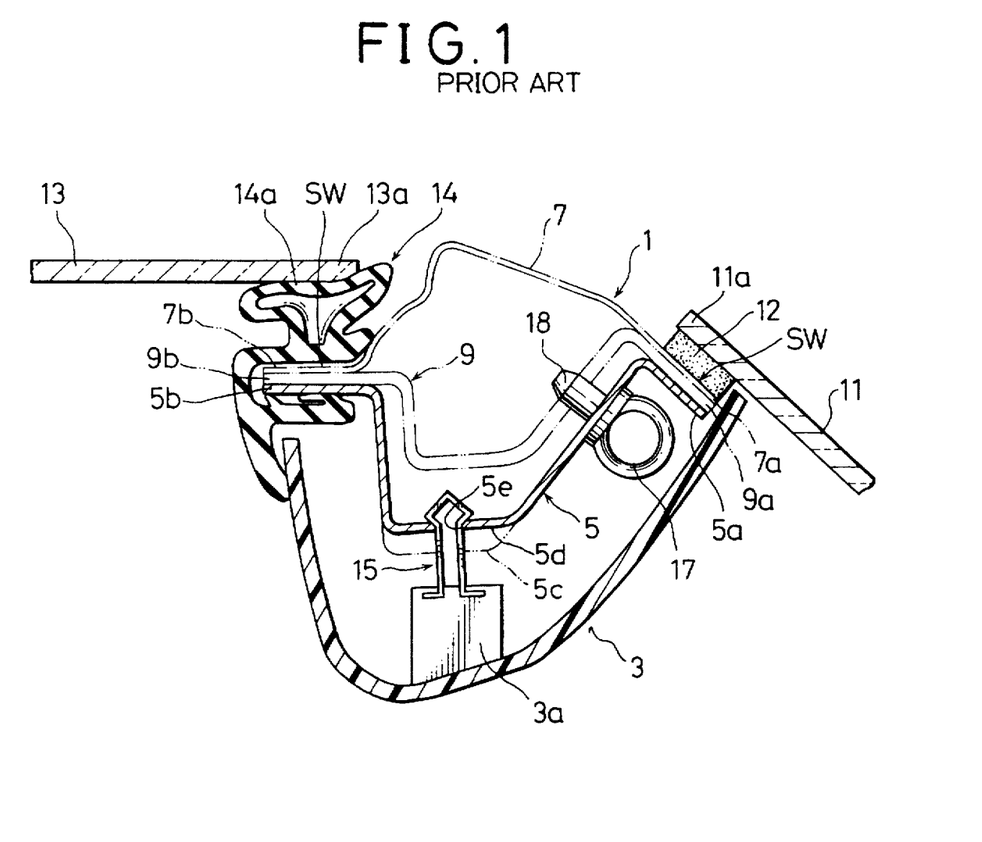
FIG. 1 is a horizontal cross sectional view showing a conventional example.
Figure 2:
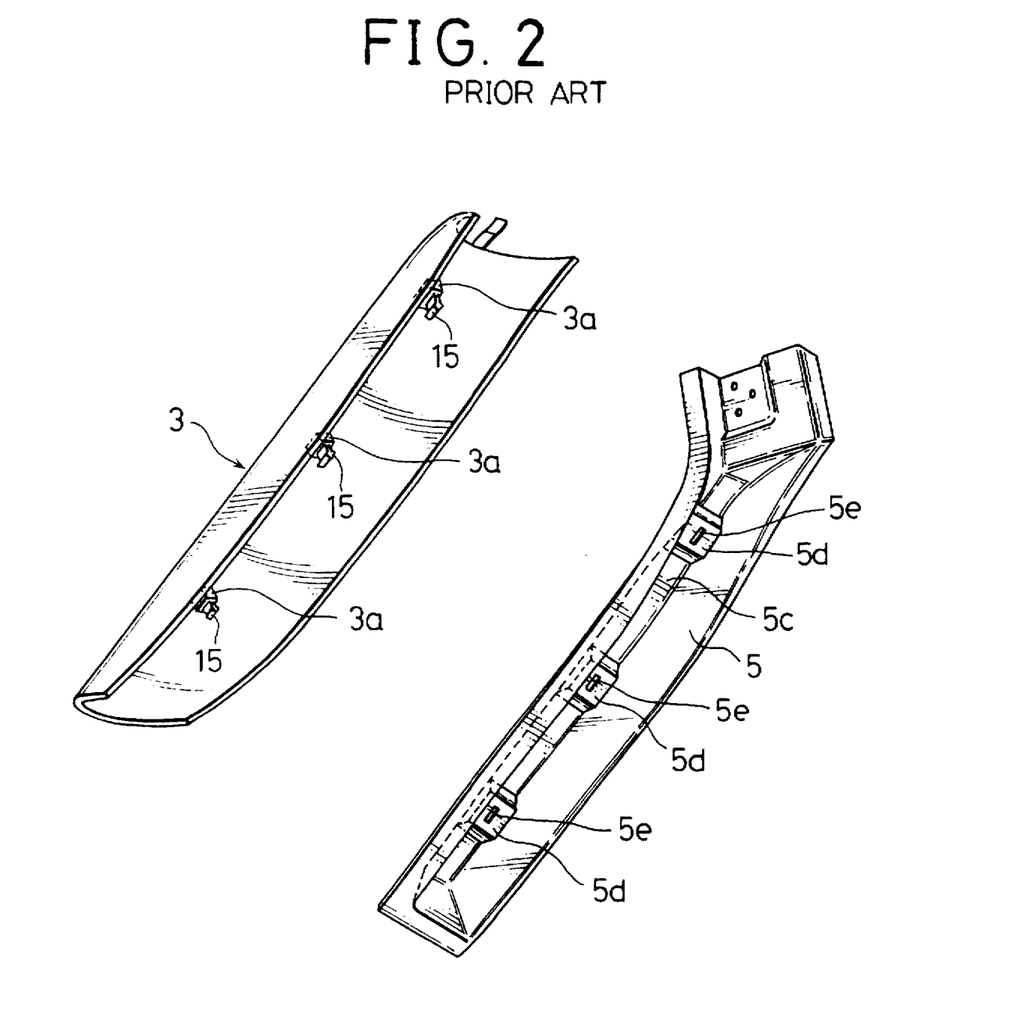
FIG. 2 is an exploded perspective view showing the conventional example shown in FIG. 1.

A conventional structure for supporting a pillar garnish is arranged, for example, as shown in FIGS. 1 and 2 (refer to Japanese Utility Model Application Laid-Open No. 5-65694). Reference numeral 1 represents a front pillar serving as the "pillar", and 3 represents a pillar garnish.

The front pillar 1 comprises a pillar inner panel 5, a pillar outer panel 7 and a reinforce panel 9 disposed between the two pillar panels 5 and 7 and having intensified strength. Corresponding flanges 5a, 7a, 9a, 5b, 7b and 9b disposed across the two pillar panels 5 and 7 and the reinforce panel 9 are mutually welded (SW) so that a shell-like column having a closed cross section is formed.

A front wind panel 11 has an end 11a, the inner surface of which is, by a bonding adhesive 12, secured to the flange 7a across the pillar outer panel 7.

A front side wind panel 13 is supported by a door (not shown). When the door is opened or closed, the inner surface of an end 13a of the front side wind panel 13 is allowed to compress a strip portion 14a of a welt 14 supported by the flange 7b in the rear portion of the pillar outer panel 7.

The pillar inner panel 5 forms a recess 5d in a top surface 5c facing the pillar garnish 3, the recess 5d includes an elongated through hole 5e formed vertically. A clip 15 projecting from the inner surface of the pillar garnish 3 through a seat 3a is received in the through hole 5e so that the pillar garnish 3 is supported by the pillar inner panel 5.

Reference numeral 17 represents a harness for conducting electric power from a battery (not shown) to a room lamp (not shown) and the like, the harness 17 being supported by the pillar inner panel 5 by another clip 18.

However, the foregoing conventional structure for supporting a pillar garnish 3 for an automobile results in difficulty in press molding the pillar inner panel 5.

If the recess 5d serving as the seat for the clip 15 and the through hole 5e are disposed perpendicular to the surface of a movable mold of a press (not shown) with respect to a stationary mold of the same, the shape of the pillar inner panel 5, which is changed three-dimensionally, cannot be molded accurately. If the molding operation is performed in such a manner that the shape of the pillar inner panel 5, which is changed three-dimensional, is formed accurately, the through hole 5e cannot be formed in a desired direction.

If a hole (not shown) for receiving the clip 18 for supporting the harness 17 is not formed simultaneously with the through hole 5e, the manufacturing cost cannot be reduced.

SUMMARY OF THE INVENTION

In view of the foregoing, an object of the present invention is to provide a structure for supporting a pillar garnish for an automobile having a structure such that a bracket, which can be formed by a bending work, is disposed between a pillar and a pillar garnish so that the shape of the pillar is simplified and molding the pillar is greatly facilitated.

According to one aspect of the present invention, a structure for supporting a pillar garnish for an automobile comprises: a pillar; a pillar garnish; and a steel bracket disposed between the pillar and the pillar garnish to cause the pillar garnish to be supported by the pillar, wherein the bracket includes a body frame having a substantially channel-like cross section formed by a top surface opposite to the pillar garnish and two side surfaces extending from two edge lines of the top surface substantially perpendicular to the top surface toward the pillar, the body frame having free ends of the two side surfaces which are welded to the pillar, a claw portion projecting over the body frame and capable of being connected to the pillar garnish, and a plurality of tag portions formed between the side surfaces of the body frame, the tag portions extend from a cut portion formed in the top surface of the body frame in the same direction as the direction of the free end of either side surface of the body frame, and a free end of each tag portion is positioned at a position defined by a distance shorter than the distance from a free end of another side surface of the body frame to the top surface of the body frame, the free end of each tag portion being formed to substantially run parallel to the top surface toward the outside.

As a result of the foregoing structure, the design lines of the front pillar can be formed independently of the bracket. Therefore, the shape of the pillar is greatly simplified and, thus, pressing the pillar is greatly improved.

The bracket enables the free end of the tag portion to be formed by a simple bending work thanks to the cut portion of the third surface of the bracket even if the two edge lines of the top surface opposite to the pillar garnish are bent such that the side surfaces extend substantially perpendicular to the top surface. Thus, manufacturing cost can be reduced.

Since the free ends of the tag portions are bent outwardly and are substantially parallel to the top surface, balance in pressing the bracket is improved. Therefore, twisting of the bracket during pressing and scattering of the bracket shape during press-molding can be prevented.

The free end of the tag portion may be held between a stationary press die and a movable press die of the same when inserted between the stationary press die and the movable press die.

As a result, the free end of the tag portion results in introduction of the panel of the material of the bracket being prevented when the press molding operation is performed. That is, twisting of the bracket when the press molding operation is performed can be prevented and scattering of the bracket can be prevented.

Other objects, features, and advantages of the invention will be evident from the following detailed description of the preferred embodiments described in conjunction with the attached drawings.

DESCRIPTION OF THE PREFERRED EMBODIMENTS

Referring to FIGS. 3 to 8, a structure for supporting a pillar garnish 73 for an automobile according to an embodiment of the present invention will now be described.

Figure 3:
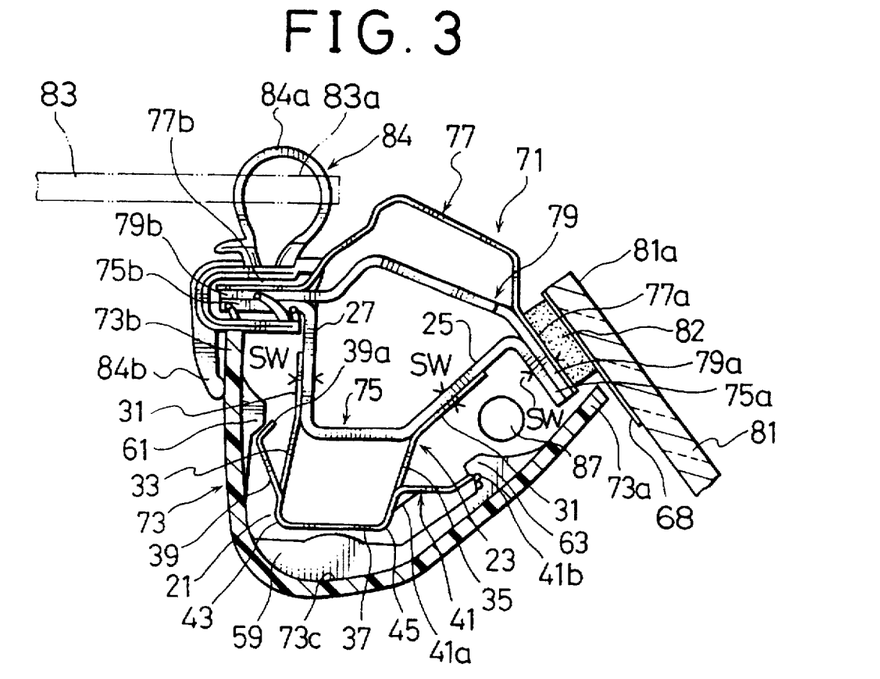
FIG. 3 is a horizontal cross sectional view showing a structure for supporting a pillar garnish for an automobile according to an embodiment of the present invention.
Figure 4:
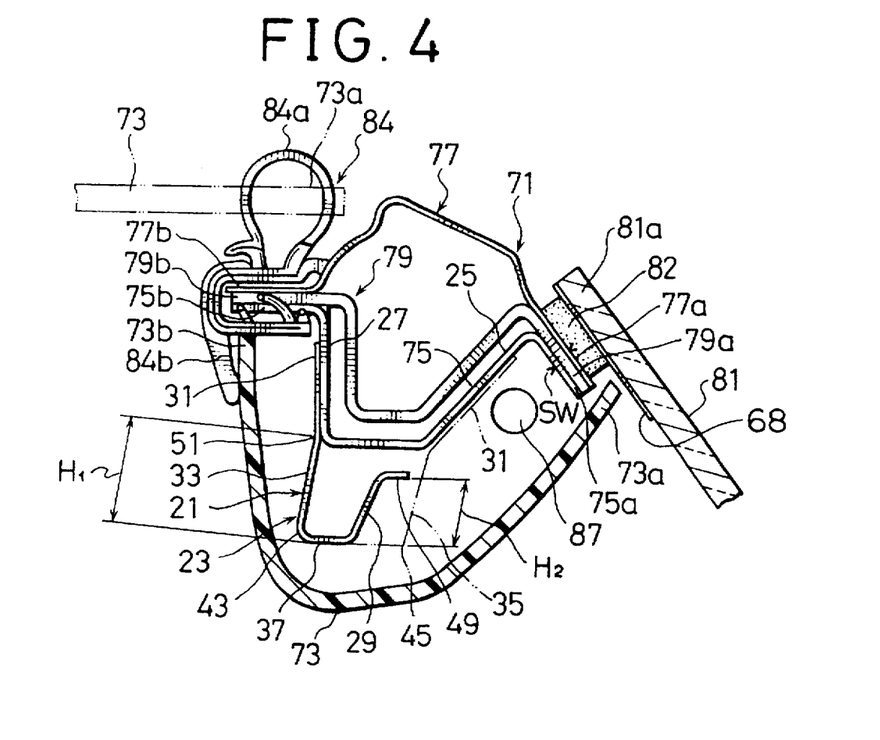
FIG. 4 is a cross sectional view showing a tag portion of a bracket and corresponding to FIG. 3.
Figure 5:
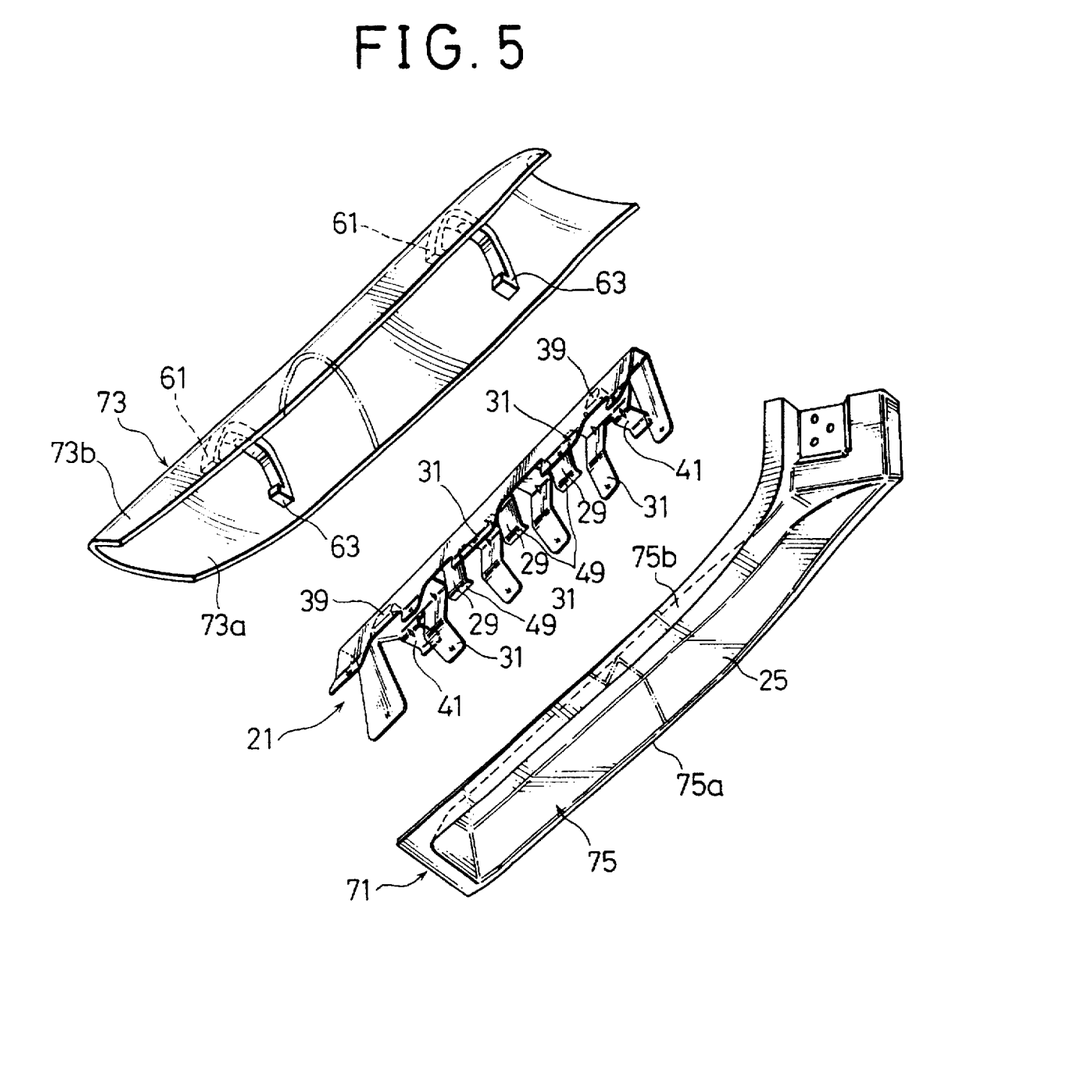
FIG. 5 is an exploded perspective view of FIGS. 3 and 4.

The structure comprises a front pillar 71, a steel bracket 21, and a pillar garnish 73.

The front pillar 71 comprises a pillar inner panel 75 having a thickness of 1.2 mm, a pillar outer panel 77 having a thickness of 0.8 mm, and a reinforce panel 79 disposed between the two pillar panels 75 and 77, and having intensified strength and a thickness of 2.0 mm. Corresponding flanges 75a, 77a, 79a, 75b, 77b, and 79b disposed across the two pillar panels 75 and 77 and the reinforce panel 79 are mutually welded so that a shell-like column having a closed cross section is formed.

A front wind panel 81 has an end 81a, the inner surface of which is, by a bonding adhesive 82, secured to the flange 77a in the forward portion of the pillar outer panel 77.

A front side wind panel 83 is supported by a door (not shown). When the door is opened or closed, the inner surface of an end 83a of the front side wind panel 83 is allowed to compress a strip portion 84a of a welt 84 supported by the flange 77a in the rear portion of the pillar outer panel 77. Note that the strip portion 84a of the welt 84 shown in FIGS. 3 and 4 is illustrated in a state before the strip portion 84 is compressed by the inner surface of the end 83a of the front side wind panel 83.

The pillar inner panel 75 is formed into a shape having a channel-like horizontal cross section by a front-surface panel 25 opposite to the end 81a of the front wind panel 81 and a rear-surface panel 27 opposite to the end 83a of the front side wind panel 83. The pillar inner panel 75 is disposed between the two wind panels 81 and 83.

The pillar garnish 73 includes a center portion, end portions 73a, 73b extending from both side ends of the center portion, a first rib 59 projecting from the inner surface of the pillar garnish 73c, and second and third ribs 61, 63, projecting from the inner surface of the end portions 73a, 73b.

Figure 6:
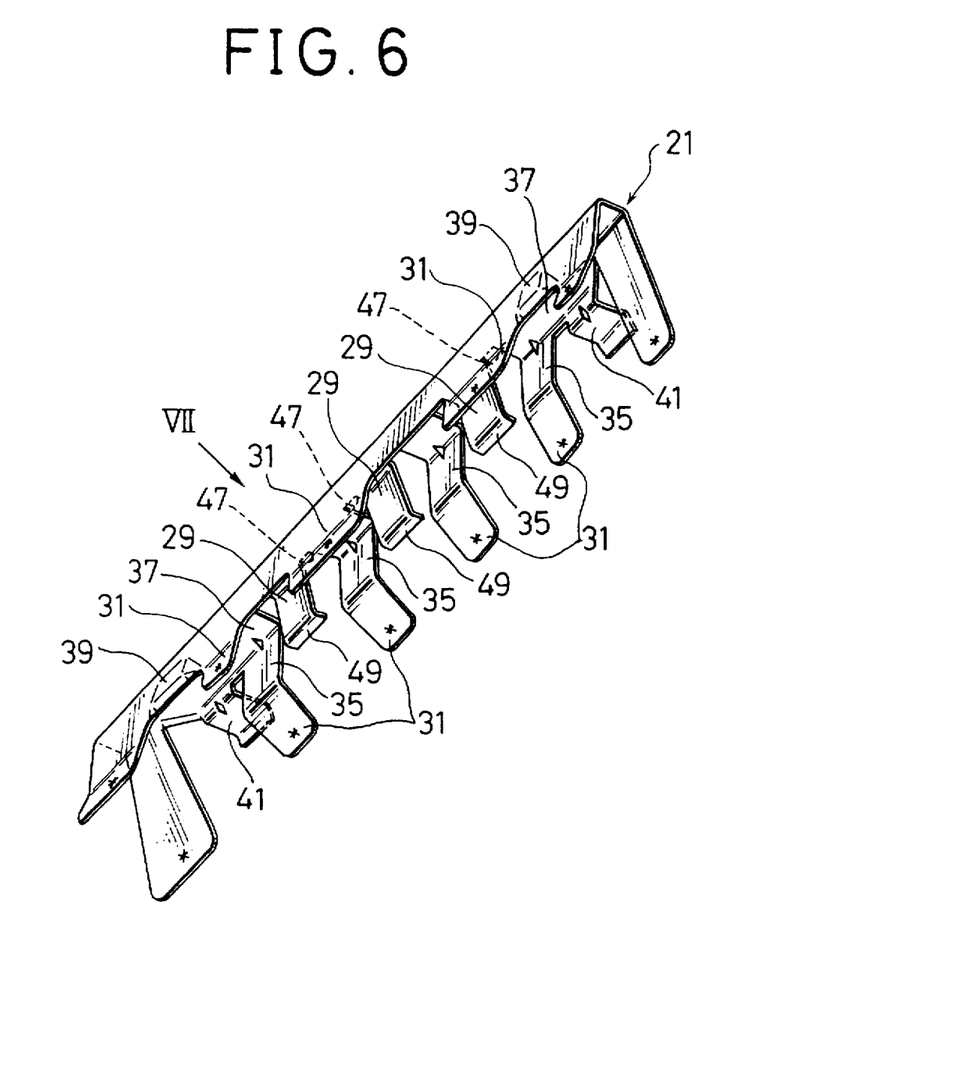
FIG. 6 is an enlarged perspective view of the bracket shown in FIG. 5.

The bracket 21 is made of a steel panel by press working. The bracket 21 includes a body frame 23, claw portions 39, 41, and a plurality of tag portions 29. The body frame 23, the claw portions 39, 41, and the tag portions 29 are formed integrally (are formed from a single piece of sheet metal). The claw portions 39, 41, and the tag portions 29 are bent from the body frame 23.

The body frame 23 has a horizontal cross section formed into a channel shape by first and second surfaces 33 and 35, which are two side surfaces, and a third surface 37 which is the top surface facing the pillar garnish 73.

The third surface 37 is opposite to the inner surface 73c of the pillar garnish 73 and is in contact with the first rib 59. The first and second surfaces 33, 35 are bent from both side ends of the third surface 37 toward the front pillar 71. End portions 31 of the first and second surfaces 33, 35 are welded to flanges 75a, 75b of a pillar inner panel 75 of the front pillar 71.

The claw portions 39, 41 project outwardly from the body frame 23 and are engaged with the second and third ribs 61, 63 of the pillar garnish 73 so that the bracket 21 supports the pillar garnish 73.

Figure 7:
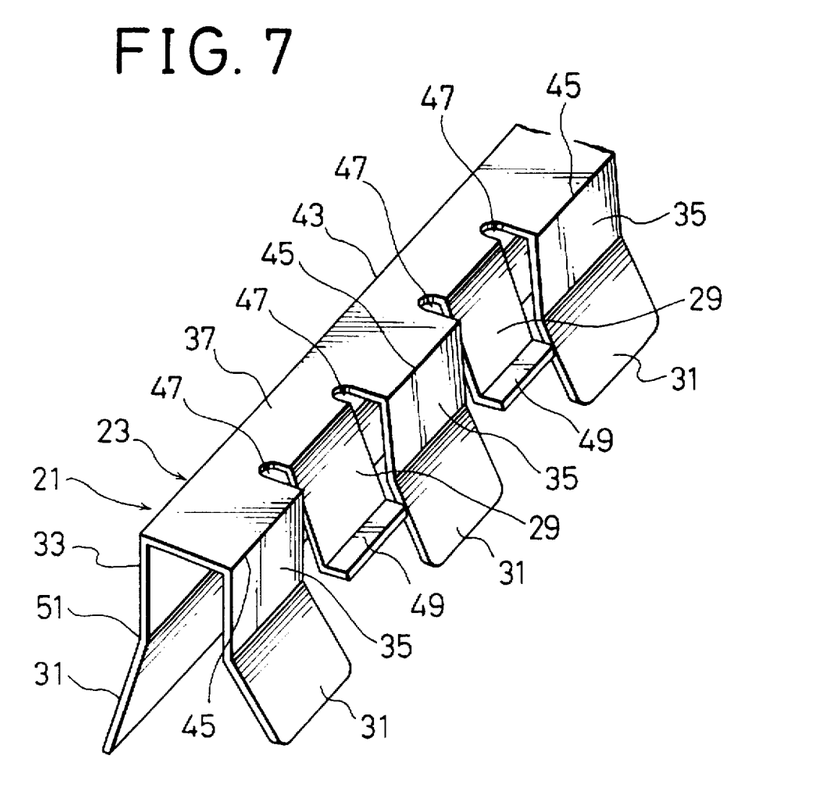
FIG. 7 is a perspective view which is view VII shown in FIG. 6.

The tag portions 29 extend from the third surfaces 37 of the body frame 23 toward the center portion of the pillar garnish 73. The tag portions 29 are separated from the second surface 35 of the body frame 23 by cut portions 47. The cut portions 47 are formed from the end portion 31 of the second surface 35 to the side end of the third surface 37. A first edge line 43 is formed between the first and third surfaces 33 and 37 of the bracket 21, and a second edge line 45 is formed between the second and third surfaces 35 and 37. The cut portions 47 permit the first and second edge lines 43, 45 to be bent such that the side surfaces extend substantially perpendicular to the top surface.

In order to weld (SW) the first and second surfaces 33 and 35 to the front-surface panel 25 and the rear-surface panel 27 of the pillar inner panel 75, a plurality of ends 31 project over the first and second surfaces 33 and 35 toward the pillar inner panel 75 so that a body frame 23 is formed.

Each of the claw portions 39 is formed into a tag shape 35 positioned above the first surface 33 and has a base portion in the third surface 37, the claw portion 39 being raised by cutting so as to have a free end adjacent to the end portion 31. The claw portion 39 is formed into a wedge shape by bending a leading end 39a thereof at the end of projection of the same toward the end portion 31.

The residual claw portion 41 is formed above the second surface 35 and has a base portion in the third surface 37, the claw portion 41 being raised by cutting while being reinforced by a bead 41a formed at the base of the portion raised by cutting. The claw portion 41 has a free end 41b running parallel to the end portion 31.

The tag portion 29 is, as shown in FIG. 4, formed to extend from a cut portion 47 formed in the third surface 37, which is the top surface of the body frame 23, in the same direction as that of the end portion 31 which is the free end of the second surface 35 which is the other side surface of the body frame 23.

The tag portion 29 has a free end 49 that is, as shown in FIG. 4, formed at a position defined by height H2 which is shorter than height H1 from a bent line portion 31 forming a free end of the first surface 33 and the end portion 31, which form the other side surface of the body frame 23, to the third surface 37, which is the top surface.

The tag portions are shorter than the first surface 33. The free ends 49 of the tag portions 29 are bent outwardly so as to be substantially parallel to the third surface 37, which is the top surface, toward the front window panel 81.

Figure 8:
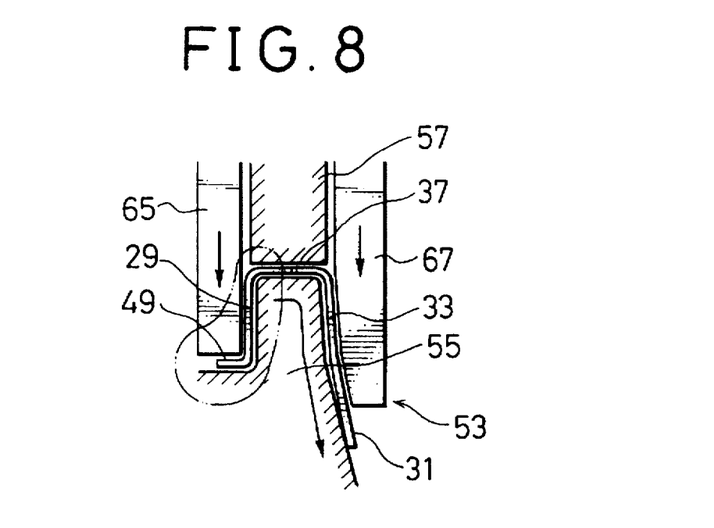
FIG. 8 is a cross sectional view of a press for molding the bracket shown in FIG. 3.

As shown in FIG. 8, a press 53 for the bracket 21 includes a stationary press die 55 and a movable press die. The movable press die comprises first, second, and third movable press dies. 57, 65, and 67, respectively. The free ends 49 of the tag portions 29 are held between the stationary press die 55 and the second movable press die 65 when the bracket 21 is pressed.

The pillar garnish 73 has a horizontal cross sectional shape having front and rear end portions 73a and 73b adjacent to flanges 75a and 75b of the pillar inner panel 75 of the front pillar 71. Moreover, an inner surface 73c of the pillar garnish 73 has a first rib 59, which is in linear contact with the third surface 37 of the bracket 21, and second and third ribs 61 and 63 connected to the claw portions 39 and 41.

The rear end portion 73b of the pillar garnish 73 is held by lips 84b of the welt 84 connected to the flanges 75b, 77b, and 79b of the front pillar 71.

A black print member 68 is disposed on the inner surface of the end 81a of the front wind panel 81 so as to shield the front end portion 73a and the bonding adhesive 82 of the pillar garnish 73 from being recognized from outside.

A harness 87 for establishing the electrical connections with a motor of a sunroof and audio equipment is disposed in the rear portion of the automobile. The harness 87 is connected to the pillar inner panel 75 of the front pillar 71 by a clip (not shown).

As a result of the foregoing structure, the end portions 31 of the first and second surfaces 33, 35 are welded to the front pillar 71, and the claw portions 39, 41 are engaged with the second and third ribs 61, 63 of the pillar garnish 73 so that the pillar garnish is supported by the front pillar 71 via the bracket 21.

Namely, the pillar garnish 73 can be connected to the front pillar 71 without a recess 5d and a through hole 5e formed on a top surface of the pillar inner panel 75 to receive a conventional clip 15 (see FIGS. 1 and 2).

If the pillar inner panel 75 needs the recess 5d and the through hole 5e, the shape of the front pillar 71 is complicated and the design lines of the front pillar 71, which are changed three-dimensionally, must be formed dependent on the position of the clip 15 making it more difficult to press the inner panel 75.

On the contrary, in the foregoing structure, the design lines of the front pillar 71 can be formed independent of the bracket 21. Therefore, the shape of the front pillar 71 is simplified and pressing the pillar inner panel 75 is greatly facilitated.

The bracket 21 has cut portions 47 formed from the end portion 31 of the second surface 35 to the side end of the third surface 37, therefore the bracket 21 can be formed by a simple bending work even if the first and second edge lines 43, 45 are bent such that the side surfaces extend substantially perpendicular to the top surface.

The free ends 49 of the tag portions 29 are bent outwardly so as to be substantially parallel to the third surface 37, therefore the balance in pressing the bracket 21 is markedly improved. Therefore, parallel surfaces (the third surface 37 and the free ends 49) are formed in the bracket 21; twisting of the bracket 21 during press working is prevented; and scattering of the bracket 21 shape is prevented.

The free ends 49 of the tag portions 29 are bent and held between the stationary press die 55 and the second movable press die 65 when pressing of the bracket 21 occurs. Namely, the second surface 33 is pressed by the third movable press die 67 and movement of the steel panel, which comprises the bracket 21, caused by the third movable press die 67 is prevented.

As a result, twisting of the bracket 21 caused by press working is prevented and scattering of the bracket 21 shape is prevented.

The claw portions 39 and 41 of the bracket 21 are formed by cutting to be raised from the bracket 21, thereby providing the claw portions 39 and 41 with spring functions.

Although the foregoing embodiment has been described to comprise the front pillar 71 (or a first pillar) as the "pillar", the present invention is not limited to the front pillar 71.

A member corresponding to the front-surface panel 25 may be positioned to face the end 83a of the front side wind panel 83 and a member corresponding to the rear-surface panel 27 may be a center pillar (or a second pillar) facing the end of the rear side wind panel.

A member corresponding to the front-surface panel 25 may face the end of the rear side wind panel and a member corresponding to the rear-surface panel 27 may be a rear pillar facing the end of the rear wind panel (or the third pillar).

The pillar may be a pillar between side wind panels of a so-called one-box car having a plurality of side wind panels disposed continuously.

In the foregoing case, the positions at which the end portions 73a and 73b of the pillar garnish body 73 are held by the claw portions 39 and 41 of the bracket 21 and the lips 84b of the welt 84 connected to the flange 75b of the pillar inner panel 75 are not, of course, limited to the rear end portion 73b as has employed in the foregoing embodiment. The front and rear end portions 73a and 73b may be respectively held as described above.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A structure for supporting a pillar garnish for an automobile comprising:
   a pillar;
   a pillar garnish including a center portion, side portions extending from the center portion, and projections projected from inside faces of the side portions; and
   a bracket disposed between the pillar and the pillar garnish, and including
      a body frame having a substantially channel-like cross section formed by a top surface and two side surfaces, and
      a claw projecting from the body frame and engaging the projections of the pillar garnish such that the bracket supports the pillar garnish,
   wherein the top surface of the body frame is opposite to and in contact with an inside face of the center portion of the pillar garnish, and the side surfaces of the body frame project from opposite ends of the top surface toward the pillar, end portions of the side surfaces being welded to the pillar.

2. A structure for supporting a pillar garnish according to claim 1, wherein the body frame and the claw are formed as a single unit, and the claw projects from the body frame.

3. A structure for supporting a pillar garnish for an automobile according to claim 1, wherein one of the side surfaces of the body frame has a cut portion extending from the end portion of the side surface to a point at which the side surface of the body frame meets the top surface of the body frame, and wherein an edge line extends between the top surface and each of the side surfaces such that the side surfaces extend substantially perpendicular to the top surface.

4. A structure for supporting a pillar garnish according to claim 1, wherein the bracket includes a plurality of tags extending from the top surface of the body frame toward the pillar, the tags being separated from one of the side surfaces of the body frame by cut portions extending from the end portion of the side surface to a point at which the side surface of the body frame meets the top surface of the body frame, and wherein an edge line extends between the top surface and each of the side surfaces such that the side surfaces extend substantially perpendicular to the top surface.

5. A structure for supporting a pillar garnish according to claim 4, wherein the tags are shorter than the other of the side surfaces.

6. A structure for supporting a pillar garnish to claim 4, wherein the body frame, the claw, and the tags are formed as a single unit, and the claw and the tags project from the body frame.

7. A structure for supporting a pillar garnish according to claim 4, wherein free ends of the tags project from and are substantially parallel to the top surface of the body frame.

8. A structure for supporting a pillar garnish for an automobile comprising:

a pillar;

a pillar garnish including a center portion having side ends, end portions extending from the side ends of the center portion, and projections projected from inside faces of the side portions; and a bracket disposed between the pillar and the pillar garnish, and including
      a body frame having a substantially channel-like cross section formed by a top surface and two side surfaces,
      a claw projecting from the body frame and engaging the projections of the pillar garnish such that the bracket supports the pillar garnish, and
      a plurality of tags projecting from the top surface of the body frame toward the pillar, and being separated from one of the side surfaces of the body frame by cut portions which extend from an end portion of the one of the side surfaces of the body frame to a point at which the one of the side surfaces of the body frame meets the top surface of the body frame, wherein the top surface of the body frame is opposite to and in contact with an inside face of the center portion of the pillar garnish, and the side surfaces of the body frame projecting from opposite ends of the top surface toward the pillar, and end portions of the side surfaces are welded to the pillar, and wherein an edge line extends between the top surface and each of the side surfaces such that the side surfaces extend substantially perpendicular to the top surface, and wherein the tags are shorter than the other of the side surfaces, and free ends of the tags project from and are substantially parallel to the top surface of the body frame.

9. A pillar garnish supporting structure for supporting a pillar garnish on an associated pillar, the supporting structure comprising:

an elongate garnish having a generally U-shaped cross section, an outer surface and an inner surface;

an engagement portion formed on the inner surface of the elongate garnish;

a deformable bracket adapted to be disposed between the elongate garnish and a pillar, the bracket having a generally U-shaped cross section including a top wall and a pair of side walls extending from opposite sides of the top wall and terminating with end portions adapted to be welded to the pillar; and a claw formed by cutting out a portion of one of the side walls of the bracket, wherein the claw is engaged by the engagement portion formed on the inner surface of the elongate garnish.

10. A supporting structure as claimed in claim 9, further comprising a plurality of notches formed on the top wall of the bracket, the notches being spaced from each other and positioned along one side of the top wall, to facilitate manipulation of the bracket such that the side walls extend substantially perpendicular to the top wall.

11. A supporting structure as claimed in claim 10, further comprising a plurality of tags formed between the plurality of notches, each tag extending from the top wall toward the pillar and having an end portion extending generally parallel to the top wall.

12. A supporting structure as claimed in claim 10, wherein the end portions of the side walls of the bracket are formed by holding the end portions between a movable mold and a plurality of stationary molds.

* * * * *